United States Patent
Balasubramanian et al.

(10) Patent No.: US 9,521,619 B2
(45) Date of Patent: Dec. 13, 2016

(54) SYSTEMS AND METHODS FOR IMPLEMENTING WLAN POWER SAVING USING AN ALTERNATE WIRELESS PROTOCOL

(71) Applicant: QUALCOMM Incorporated, San Diego, CA (US)

(72) Inventors: Vijaykumar Balasubramanian, Chennai (IN); Sasidhar Subramaniam, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 14/252,636

(22) Filed: Apr. 14, 2014

(65) Prior Publication Data
US 2015/0296457 A1 Oct. 15, 2015

(51) Int. Cl.
| | |
|---|---|
| H04W 52/02 | (2009.01) |
| H04W 84/12 | (2009.01) |
| H04W 80/00 | (2009.01) |
| H04W 48/08 | (2009.01) |
| H04W 88/06 | (2009.01) |

(52) U.S. Cl.
CPC ........ *H04W 52/0225* (2013.01); *H04W 48/08* (2013.01); *H04W 80/00* (2013.01); *H04W 84/12* (2013.01); *H04W 88/06* (2013.01); *Y02B 60/50* (2013.01)

(58) Field of Classification Search
CPC .... H04W 40/244; H04W 48/16; H04W 74/04; H04W 74/06; H04W 88/08
See application file for complete search history.

(56) References Cited

U.S. PATENT DOCUMENTS

| | | | |
|---|---|---|---|
| 2008/0198818 A1* | 8/2008 | Montemurro | H04W 48/08 370/338 |
| 2010/0061326 A1* | 3/2010 | Lee | H04W 72/12 370/329 |
| 2012/0106452 A1* | 5/2012 | Knecht | H04W 48/08 370/328 |
| 2012/0182915 A1* | 7/2012 | Wentink | H04W 52/0216 370/311 |

* cited by examiner

*Primary Examiner* — Jae Y Lee
(74) *Attorney, Agent, or Firm* — Paradice and Li LLP

(57) ABSTRACT

Systems and methods are disclosed for wireless communication including transmitting information regarding pending data to be transmitted using a first wireless protocol with a second wireless protocol to facilitate power conservation by allowing circuitry associated with the first wireless protocol to remain in a power save mode.

18 Claims, 3 Drawing Sheets

SYSTEMS AND METHODS FOR IMPLEMENTING WLAN POWER SAVING USING AN ALTERNATE WIRELESS PROTOCOL

FIELD OF THE PRESENT DISCLOSURE

This disclosure generally relates to wireless communication systems and more specifically to systems and methods for conserving power while coordinating delivery of buffered data.

BACKGROUND

Conventional power save mechanisms in a wireless local area network (WLAN) operating under IEEE 802.11 may utilize a periodic beacon transmitted by the access point (AP) to inform an associated station (STA) in power save mode that data is pending delivery. Generally, the traffic indication map (TIM) information element (IE) in the beacons includes information regarding unicast traffic, allowing a STA to determine whether to poll the AP to initiate transfer of data that has been buffered. Delivery of group traffic, on the other hand, is not initiated by the stations. Rather, a subset of the beacons, known as delivery TIM (DTIM) beacons, are transmitted at a periodicity advertised by the AP and may be used to indicate that group traffic has been buffered and will be transmitted following the DTIM beacon.

Accordingly, a STA typically will be configured to awaken in order to receive the DTIM beacon and may remain awake to receive the data when the DTIM beacon indicates there is buffered group traffic, as otherwise a STA that remains in power save mode would miss any transmitted group traffic. Consequently, the STA interrupts the power save mode and awakens at every DTIM interval to receive the beacon, whether or not data is pending delivery. When no data is pending, this periodic awakening represents unnecessary power expenditure.

As will be appreciated, there is a need for systems and methods to coordinate delivery of buffered data in a manner that conserves power at a STA. In turn, there is a need to communicate DTIM information to a STA in a manner that reduces interruptions when operating in a power save mode. This disclosure satisfies these and other needs.

SUMMARY

This specification discloses a method for wireless communications that may include operating a first wireless protocol module of a receiving wireless communications device in a power save mode, receiving information regarding pending data from a transmitting wireless communications device to the receiving wireless communications device using a second wireless protocol and operating the first wireless protocol module of the receiving wireless communications device in an active mode to receive the pending data. Further, capabilities regarding the second wireless protocol may be established between the receiving wireless communications device and the transmitting wireless communications device.

In one aspect, the transmitting wireless communications device may be informed that the receiving wireless communications device will be operating in the power save mode. Further, the transmitting wireless communications device may deliver information regarding pending data to the receiving wireless communications device using the second wireless protocol when the receiving wireless communications device is operating in the power save mode and may deliver information regarding pending data to the receiving wireless communications device using the first wireless protocol when the receiving wireless communications device is operating in the active mode.

In one aspect, the first wireless protocol may be a wireless local area network (WLAN) protocol. In such embodiments, the information regarding pending data may be delivery traffic indication map (DTIM) information. Further, the pending data may be group traffic. In one embodiment, the second wireless protocol may be a cellular network protocol.

This disclosure also includes a wireless communications device that may include first wireless protocol module configured to communicate using a first wireless protocol, second wireless protocol configured to communicate using a second wireless protocol and an alternate wireless protocol (AWP) manager that may be configured to communicate information regarding pending data to be transmitted using the first wireless protocol between the first wireless protocol module and the second wireless protocol module.

In one aspect, the first wireless protocol module may be configured to operate in a power save mode and the AWP manager may communicate information regarding pending data received using the second wireless protocol module to the first wireless protocol module when the first wireless protocol module is operating in the power save mode. Further, the first wireless protocol module may signal for information regarding pending data to be transmitted using the second wireless protocol before operating the first wireless protocol module in the power save mode. Still further, the first wireless protocol module may be configured to transition from the power save mode to an active mode after receiving information regarding pending data from the AWP manager.

In another aspect, the first wireless protocol module may generate information regarding pending data to be delivered to a receiving wireless communications device using the first wireless protocol module and the AWP manager may communicate the generated information to the second wireless protocol module for transmission to the receiving wireless communications device using the second wireless protocol. Further, the AWP manager may communicate the generated information to the second wireless protocol module after the first wireless protocol module receives a signal that the receiving wireless communications device will be operating in a power save mode.

As noted, the first wireless protocol may be a wireless local area network (WLAN) protocol. In such embodiments, the information regarding pending data may be delivery traffic indication map (DTIM) information. Further, the pending data may be group traffic. In one embodiment, the second wireless protocol may be a cellular network protocol.

This disclosure also includes a non-transitory processor-readable storage medium for a wireless communications device, the processor-readable storage medium having instructions thereon, when executed by a processor to cause the wireless communications device to communicate information regarding pending data to be transmitted using a first wireless protocol between a first wireless protocol module and a second wireless protocol module. In one aspect, the storage medium may include instructions to cause the first wireless protocol module to operate in a power save mode and to cause the first wireless protocol module to operate in an active mode after receiving information regarding pending data. In another aspect, the storage medium may include instructions to cause the first wireless protocol module to generate information regarding pending data to be delivered to a receiving wireless communications device using the first wireless protocol module and to transmit the generated information using the second wireless protocol.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION OF THE INVENTION

Figure 1:
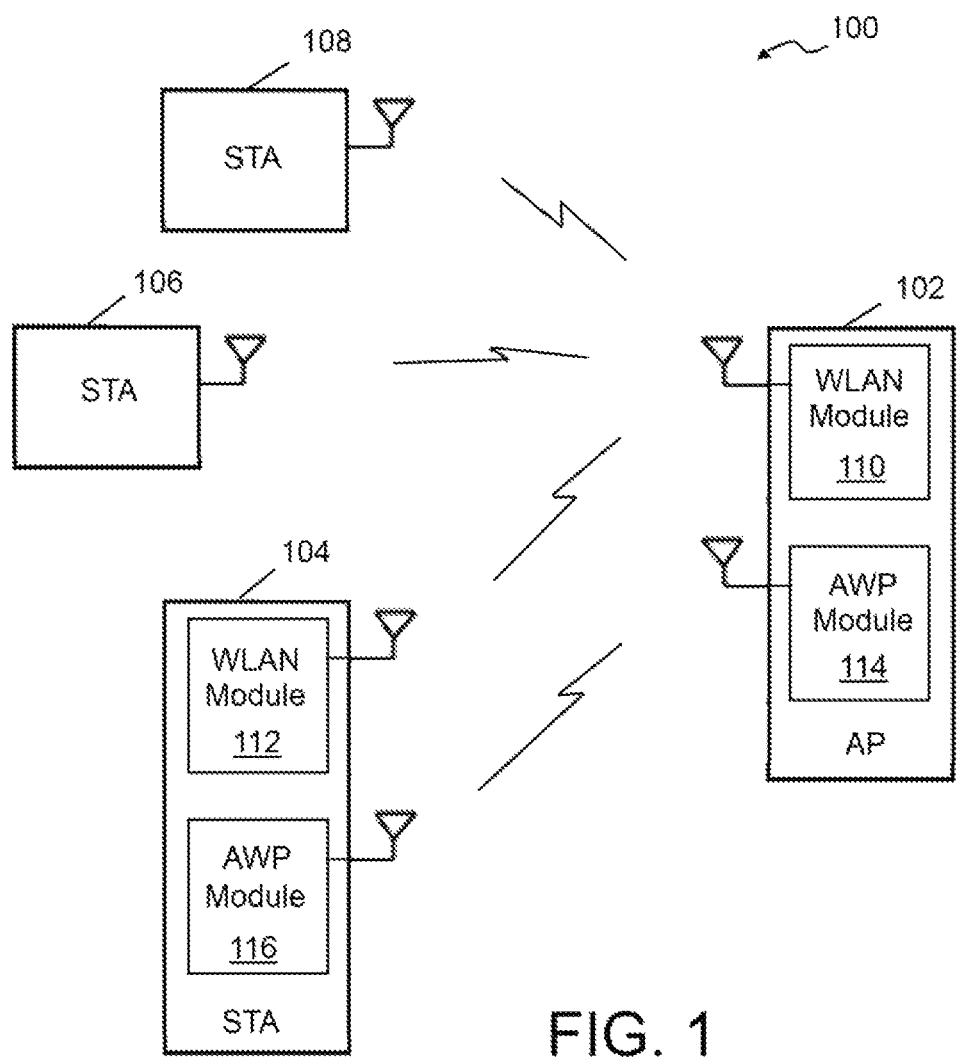
FIG. 1 schematically depicts a wireless system operating as a WLAN, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system.

Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Further, embodiments are discussed in specific reference to wireless networks. As such, this disclosure is applicable to any suitable wireless communication systems having the necessary characteristics. Although discussed in specific reference to an infrastructure WLAN, the techniques of this disclosure may be applied to other network configurations, to other wireless communication systems or to other wireless protocols involving transmissions for coordinating delivery of pending data traffic from wireless network node to another. For example, one of skill in the art will recognize that these techniques may be applied to an ad hoc network or a peer to peer network such as WiFi Direct®. Further, the access point functionality involving such beacon transmissions may be embedded in other devices of an information handling system such as, for example, routers, switches, servers, computers, or the like, and the designation as an AP is not limited to dedicated access point devices.

Unless defined otherwise, all technical and scientific terms used herein have the same meaning as commonly understood by one having ordinary skill in the art to which the disclosure pertains.

Finally, as used in this specification and the appended claims, the singular forms "a", "an" and "the" include plural referents unless the content clearly dictates otherwise.

As indicated, this disclosure involves systems and methods to foster conservation of power by delivering information regarding pending data, such as DTIM information, without interrupting the power save mode of a receiving node of the network. It will be appreciated that conventional 802.11 protocols utilize DTIM beacons to signal stations that group traffic (including multicast, broadcast data or both) has been buffered at an AP and will be sent following the DTIM beacon. The techniques of this disclosure may be used to deliver sufficient DTIM information to inform a STA of pending group traffic using an alternate wireless protocol (AWP), allowing at least a portion of the STA's WLAN system to remain in power save mode.

These systems and methods are described in reference to an exemplary wireless communication system 100 as shown in FIG. 1, which includes a first wireless communications device acting in an access point role, AP 102, and a second wireless communications device acting in a station role, STA 104. AP 102 manages a basic service set (BSS) that includes at least STA 104, but may also include any suitable number of additional nodes, such as STA 106 and STA 108. These additional nodes may be configured in a similar manner to STA 104 to receive DTIM information over an AWP or may be legacy devices that operate in a conventional manner. Although discussed in reference to a WLAN, these techniques may also be applied to other network architectures having analogous aspects. Operation of AP 102 in wireless communication system 100 includes the periodic transmission of beacon management frames. The beacon is used to communicate parameters regarding operation of wireless communication system 100, including identification information, supported rates, timing information and the like. The time interval between the start of two consecutive beacons is called a beacon interval and may be used to establish a target beacon transmit time (TBTT). The beacon interval may be fixed or variable and may be set to a suitable duration (e.g., 100 msec). As discussed above, a subset of beacons, referred to herein as DTIM beacons, are transmitted at an advertised periodicity and include the DTIM IE.

Conventionally, AP 102 may transmit the DTIM beacons using WLAN module 110, which is received at the associated stations by complementary WLAN technology, such as WLAN module 112 of STA 104. According to the techniques of this disclosure described below, AP 102 may determine that STA 104 has AWP capabilities and may transmit DTIM information using AWP module 114 that is received by corresponding AWP module 116 at STA 104. Further, AP 102 may be configured to route DTIM information to STA 104 using the AWP whenever the AWP communications link exists or only when STA 104 has signaled that it is operating in a power save mode.

Figure 2:
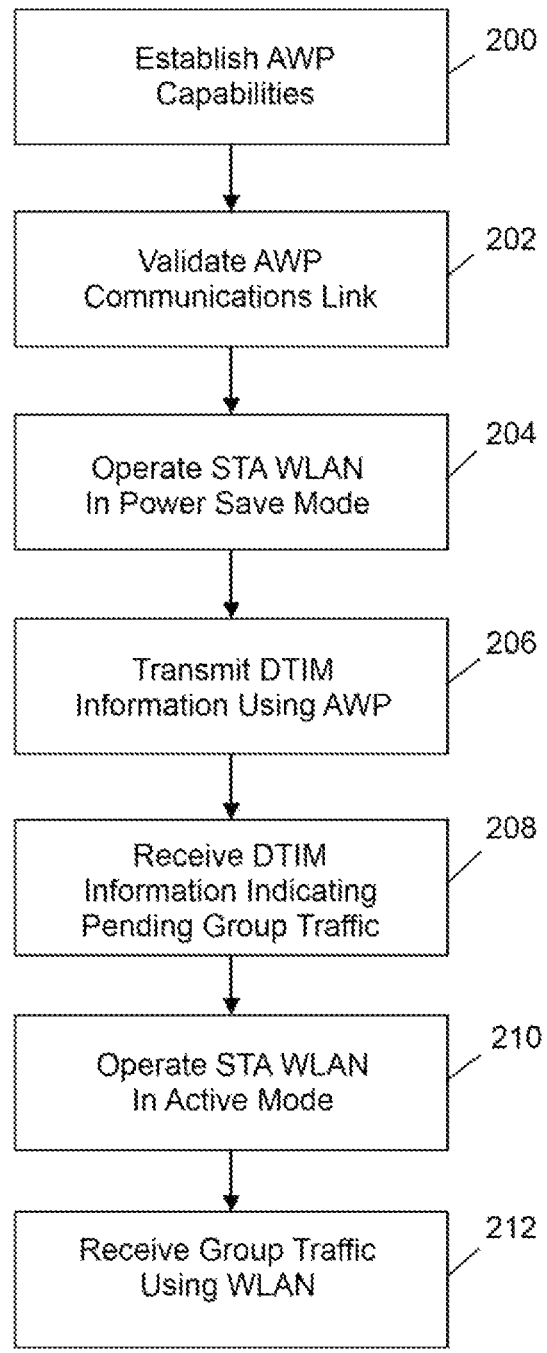
FIG. 2 is a flowchart showing an exemplary routine for communicating information regarding pending data using an alternate wireless protocol, according to one embodiment.

To help illustrate aspects of the disclosure, the flowchart depicted in FIG. 2 represents one embodiment in the context of AP 102 and STA 104. As shown, a suitable routine may begin in 200 with AP 102 and STA 104 establishing their respective AWP capabilities. This may be achieved in any suitable manner, such as through the exchange of appropriate IEs during discovery and association, or may be performed anytime after a WLAN communications link has been established. For example, AP 102 may advertise AWP capability in a beacon, such as by using a vendor specific IE and STA 104 may respond with AWP capability in an association request. Next, in 202, AP 102 and STA 104 may determine the viability of communications using AWP module 114 and AWP module 116, such as by performing a handshake exchange. STA 104 may then signal AP 102 that it is entering a power save mode in 204. STA 104 may be configured to enter the power save mode after a designated idle period or in response to any other desired criteria. In one aspect, AP 102 may deliver DTIM information regarding group traffic while STA 104 is in power save mode using the AWP, as indicated by 206. Additionally, AP 102 may also signal the existence of buffered unicast traffic, thereby conveying the information that would be sent conventionally using a TIM beacon. As desired and depending upon the implementation, any suitable information regarding pending data that will be or may be transmitted may be delivered using the AWP. In 208, STA 104 receives DTIM information indicating AP 102 has group traffic pending transmission. Accordingly, STA 104 then transitions WLAN module 112 from power save mode to active mode in 210, allowing STA 104 to receive the group traffic when transmitted by AP 102 in 212. Likewise, if STA 104 receives TIM information indicating the presence of unicast traffic at AP 102, STA 104 may elect to activate WLAN module 112 and poll AP 102 to initiate transfer or may defer delivery, as desired.

Wireless communications devices may have multiple wireless communication systems configured to support multiple wireless protocols to gain flexibility, to provide enhanced capabilities and to exploit different advantages that may be presented by the respective protocols. Thus, AP 102 and STA 104 may establish a connections link over the AWP using any available technique. In one embodiment, this may be a data connection utilizing transport control protocol and internet protocol (TCP/IP) over a mobile network. For example, AP 102 may map an IP address and port to the mobile network, allowing STA 104 to open a connection using the specified parameters. Generally, any wireless protocol that is employed by both the STA and AP may be used, such cellular networks including the "2G" Global System for Mobile Communications (GSM) protocol, the "2G" Code Division Multiple Access (CDMA) protocol, the "3G" Universal Mobile Telecommunications System (UMTS) protocol, the "4G" Long Term Evolution (LTE) protocol, the WiMax® protocol, the high speed packet access (HSPA(+)) protocol, the high-speed downlink packet access (HSDPA) protocol, the enhanced data GSM environment (EDGE) protocol, and others. Further, any other suitable wide are network (WAN) or personal area network (PAN) technology may also be employed, such as BLUETOOTH® (Bluetooth), ZigBee®, wireless universal serial bus (USB), ANT® and the others having the comparable characteristics. In one aspect, the AWP may already be active or may offer a power efficient idle mode, such that routing the DTIM information over the AWP may represent a power savings compared to activating the WLAN system to receive each DTIM beacon.

Figure 3:
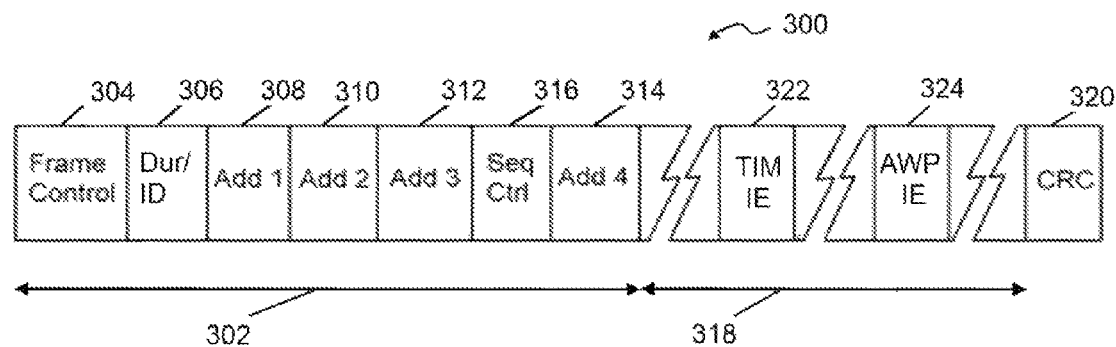
FIG. 3 schematically depicts the format of a DTIM beacon, according to one embodiment.

An example of a generalized beacon frame 300 having a format corresponding to IEEE 802.11 standards is depicted in FIG. 3. Frame 300 includes a MAC header 302, containing the frame control 304, duration/ID 306, address fields 308, 310, 312 and 314 and sequence control field 316. Frame 300 further includes a variable length frame body 318 and cyclic redundancy check (CRC) field 320. Frame control 304 segment of MAC header 302 includes fields providing various types of control information, including an identification of the 802.11 protocol of the frame, the type and subtype of the frame, distribution system information, information regarding additional information to be transmitted, security and order information. CRC field 320 may be employed to provide a frame check sequence (FCS) function.

Frame body 318 may be used to convey information and operational parameters regarding wireless communication system 100 and may include fields required by 802.11 standards as well as optional vendor-specific information elements. In particular, frame body 318 may include group traffic information in the form of TIM IE 322. In current standards (but may not be required in the future), TIM IE 322 is typically the sixth element of frame body 318 and contains a number of fields to help coordinate power save modes with associated stations, such as STA 104, by communicating the presence or absence of buffered unicast and group traffic. For unicast traffic, a virtual bitmap is used to indicate the presence or absence of buffered data for each associated station. Parameters associated with DTIM beacons are communicated using the DTIM Count, which indicates the number of beacons that will be sent before the next DTIM beacon, and the DTIM period, which indicates the number of non-DTIM beacons between DTIM beacons. TIM IE 322 also includes a bitmap control field, with the first bit used to signal the presence or absence of buffered multicast or broadcast data. According to techniques of this disclosure, frame body 318 may also advertise AWP capabilities in the form of AWP IE 324. Under 802.11 specifications, frame body 318 may include a plurality of proprietary information elements that may be vendor-defined, any of which may be employed as AWP IE 324. Notwithstanding, a new AWP IE 324 may be defined and incorporated by IEEE into a suitable 802.11 protocol. As desired, AP 102 may transmit the DTIM information in a similar format to beacon frame 300 or may otherwise transmit sufficient DTIM information to allow STA 104 to determine that group traffic is pending.

Figure 4:
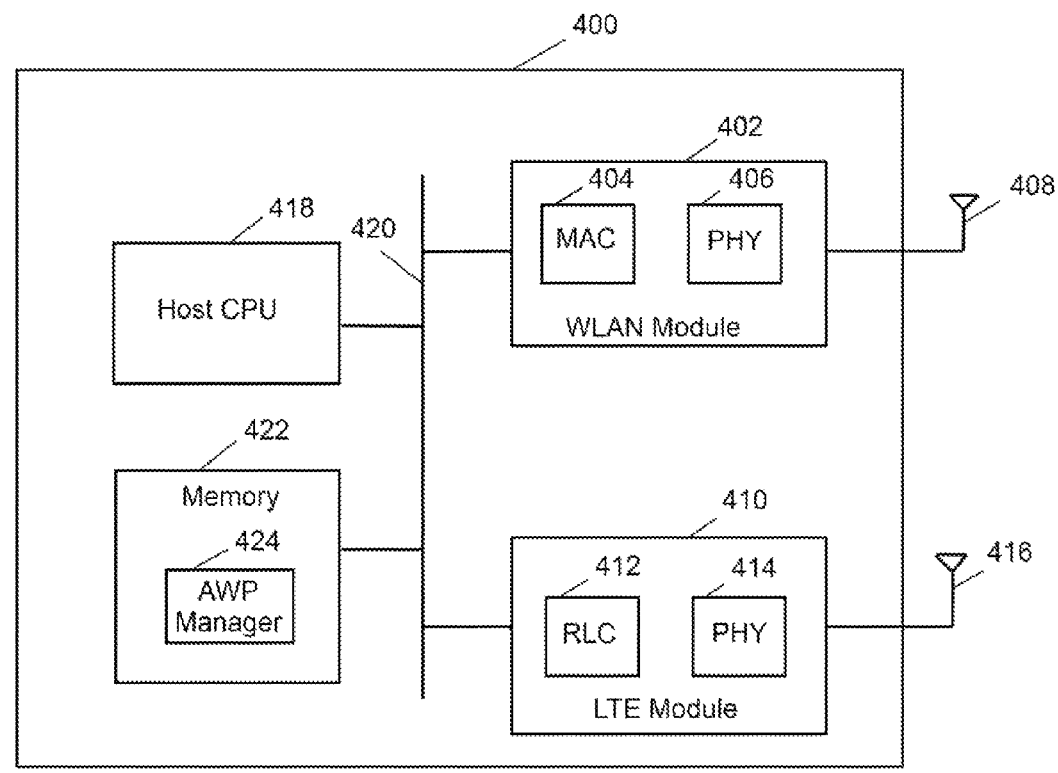
FIG. 4 schematically depicts functional blocks of a wireless communications device configured for communicating information regarding pending data using an alternate wireless protocol, according to one embodiment.

Next, high level functional blocks of one embodiment of a wireless communications device 400 that may be configured to function in the role of AP 102 or STA 104 are depicted in FIG. 4. Wireless communications device 400 may employ an architecture in which the lower levels of the wireless protocol stack are implemented through firmware and/or hardware in respective subsystems. As shown, wireless communications device 400 may therefore include WLAN module 402, having media access controller (MAC) 404 that performs functions related to the handling and processing of frames of data including verification, acknowledgment, routing, formatting and the like. Incoming and outgoing frames are exchanged between MAC 404 and physical layer (PHY) 406, which may include the functions of modulating the frames according to the relevant 802.11 protocol as well as providing the analog processing and RF conversion necessary to provide transmission and reception of wireless signals through antenna 408.

Depending on the design and capabilities of wireless communications device 400, at least one AWP may be enabled, such as a cellular network protocol. In the embodiment shown, wireless communications device 400 may include LTE module 410 that implements a data link layer control access to the wireless medium through radio link controller (RLC) 412 configured to perform functions related to the handling and processing of frames of data including verification, acknowledgment, routing, formatting and the like. Incoming and outgoing frames may be exchanged between RLC 412 and physical layer (PHY) 414. Together, RLC 412 and PHY 414 modulate frames of information according to the LTE protocol and provide the analog processing and RF conversion necessary to transmit and receive wireless signals through antenna 416.

While WLAN module 402 and LTE module 410 are each shown as having one antenna for the purpose of illustration, wireless communications device 400 may include multiple antennas for each wireless protocol as desired, such as to enable the use of multiple streams. Further, wireless communications device 400 may be configured to share any number of antennas between wireless modules using conventional antenna switching techniques. Further, WLAN module 402 and LTE module 410 may be co-located on a common system (e.g., on the same circuit board or on distinct circuit boards within the same system, or may be embedded on the same integrated circuit as in a system on a chip (SoC) implementation).

Wireless communications device 400 may also include host CPU 418 configured to perform the various computations and operations involved with the functioning of wireless communications device 400, in its role as either AP 102 or STA 104. Host CPU 418 may be coupled to WLAN module 402 and LTE module 410 through bus 420, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the wireless protocols may be implemented in software stored in memory 422 that may be accessed by host CPU 418 over bus 420.

In the embodiment shown, wireless communications device 400 also features AWP manager 424 configured to communicate DTIM information between WLAN module 402 and LTE module 410. For example, in one aspect wireless communications device 400 may be configured to operate in the role of an AP, such as AP 102. Accordingly, when WLAN module 402 has pending group traffic for delivery to a STA operating in power save mode and having AWP capabilities, AWP manager 424 may be configured to convey corresponding DTIM information from WLAN module 402 to LTE module 410, for transmission using the AWP. In another aspect, wireless communications device 400 may be configured to operate in the role of a STA, such as STA 104. In such embodiments, AWP manager 424 may be configured to convey DTIM information received by LTE module 410 to WLAN module 402, allowing the WLAN module 402 to be operated in active mode when the DTIM information indicates group traffic is pending at AP 102. As will be appreciated, AWP manager 424 may interact with MAC 404 to achieve the desired degree of coordination. AWP manager 424 may also interact at the application layer as appropriate. In one aspect, AWP manager 424 may be implemented as processor-readable instructions stored in memory 422 that may be executed by host CPU 418 as depicted in FIG. 4. However, AWP manager 424 may be implemented in any location using any combination of software, firmware and hardware as desired.

Benefits associated with the techniques of this disclosure may be appreciated in a number of contexts. In one aspect, wireless communications device 400 may be implemented as a phone that offers WLAN connectivity in addition to telecommunications using a mobile network. The telecommunications may be provided using conventional tower-based cells or may be implemented as a femtocell. During use, wireless communications device 400 may be associated with a WLAN but may spend a significant portion of time in an idle condition when it is not actively transmitting or receiving data over the WLAN. As described above, under a conventional implementation of DTIM beacons, wireless communications device 400 periodically awakens to receive the beacon to avoid missing group traffic. When no traffic is present, this may significantly mitigate the ability of wireless communications device 400 to save power. By using the techniques of this disclosure, WLAN module 402 of wireless communications device 400 may remain in power save mode when idle without awakening for the DTIM beacons. The AWP, such as implemented by LTE module 410, may be active as a matter of normal operation to allow the receipt of incoming phone calls for example. Further, the idle but active mode of the AWP may represent a more efficient implementation than the DTIM procedures dictated by conventional 802.11 standards. Thus, wireless communications device 400 may effectively conserve power by receiving DTIM information over the AWP rather than by continually awakening WLAN module 402 to receive DTIM beacons.

Described herein are presently preferred embodiments. However, one skilled in the art that pertains to the present invention will understand that the principles of this disclosure can be extended easily with appropriate modifications to other applications.

What is claimed is:

1. A method for wireless communications comprising:
operating a first wireless protocol module of a receiving wireless communications device in a power save mode, wherein the first wireless protocol module is configured to communicate using a first wireless protocol;
maintaining a second wireless protocol module of the receiving wireless communications device in an active mode to receive information regarding pending group traffic data from a transmitting wireless communications device using a second wireless protocol; and
selectively operating the first wireless protocol module of the receiving wireless communications device in an active mode to receive the pending group traffic data.

2. The method of claim 1, further comprising establishing capabilities regarding the second wireless protocol between the receiving wireless communications device and the transmitting wireless communications device.

3. The method of claim 1, further comprising informing the transmitting wireless communications device that the receiving wireless communications device will be operating in the power save mode.

4. The method of claim 3, wherein the transmitting wireless communications device is configured to deliver information regarding pending group traffic data to the receiving wireless communications device using the second wireless protocol when the receiving wireless communications device is operating in the power save mode, and is configured to deliver information regarding pending group traffic data to the receiving wireless communications device using the first wireless protocol when the receiving wireless communications device is operating in the active mode.

5. The method of claim 1, wherein the first wireless protocol is a wireless local area network (WLAN) protocol.

6. The method of claim 5, wherein the information regarding pending group traffic data is delivery traffic indication map (DTIM) information.

7. The method of claim 1, wherein the second wireless protocol is a cellular network protocol.

8. A wireless communications device comprising:
a first wireless protocol module configured to communicate using a first wireless protocol;
a second wireless protocol module configured to communicate using a second wireless protocol;
one or more processors; and
a memory storing instructions that, when executed by the one or more processors, cause the wireless communications device to:
operate the first wireless protocol module in a power save mode;
maintain the second wireless protocol module in an active mode to receive information regarding pending group traffic data from another wireless communications device using a second wireless protocol; and
selectively operate the first wireless protocol module in an active mode to receive the pending group traffic data.

9. The wireless communications device of claim 8, wherein execution of the instructions further causes the wireless communications device to:
communicate the information regarding pending group traffic data received using the second wireless protocol module to the first wireless protocol module when the first wireless protocol module is operating in the power save mode.

10. The wireless communications device of claim 9, wherein execution of the instructions further causes the wireless communications device to:
signal the other wireless communications device to use the second wireless protocol to transmit the information regarding pending group traffic data before operating the first wireless protocol module in the power save mode.

11. The wireless communications device of claim 9, wherein execution of the instructions to selectively operate the first wireless protocol module in the active mode causes the wireless communications device to:
transition the first wireless protocol module from the power save mode to the active mode upon receiving the information regarding pending group traffic data.

12. The wireless communications device of claim 8, wherein the first wireless protocol module is configured to receive the information regarding pending group traffic data when operating in the active mode.

13. The wireless communications device of claim 8, wherein the second wireless protocol is a cellular network protocol.

14. The wireless communications device of claim 8, wherein the first wireless protocol is a wireless local area network (WLAN) protocol.

15. The wireless communications device of claim 14, wherein the information regarding pending group traffic data is delivery traffic indication map (DTIM) information.

16. A non-transitory computer-readable medium storing instructions that, when executed by a processor of a wireless communications device, causes the wireless communications device to:
operate a first wireless protocol module of the wireless communications device in a power save mode;
maintain a second wireless protocol module of the wireless communications device in an active mode to receive information regarding pending group traffic data from another wireless communications device using a second wireless protocol; and
selectively operate the first wireless protocol module in an active mode to receive the pending group traffic data.

17. The non-transitory computer-readable storage medium of claim 16, wherein execution of the instructions to selectively operate the first wireless protocol module in the active mode causes the wireless communications device to:
transition the first wireless protocol module from the power save mode to the active mode upon receiving the information regarding pending group traffic data.

18. The storage medium of claim 16, wherein execution of the instructions further causes the wireless communications device to:
communicate the information regarding pending group traffic data received using the second wireless protocol module to the first wireless protocol module when the first wireless protocol module is operating in the power save mode.

* * * * *